US005571553A

United States Patent [19]
Stein

[11] Patent Number: 5,571,553
[45] Date of Patent: Nov. 5, 1996

[54] HIGH ENERGY FOOD PRODUCTS CONTAINING PARTIALLY HYDROGENATED STRUCTURED LIPIDS

[75] Inventor: Thomas P. Stein, Cherry Hill, N.J.

[73] Assignee: University of Medicine and Dentistry of New Jersey, Newark, N.J.

[21] Appl. No.: 317,995

[22] Filed: Oct. 4, 1994

Related U.S. Application Data

[63] Continuation of Ser. No. 948,282, Sep. 18, 1992, abandoned.

[51] Int. Cl.$^6$ ........................................................ A23D 7/00
[52] U.S. Cl. ........................... 426/607; 426/810; 426/660
[58] Field of Search ..................................... 426/607, 810, 426/593, 660

[56] References Cited

U.S. PATENT DOCUMENTS

| | | | |
|---|---|---|---|
| 4,235,939 | 11/1980 | Kimberly | 426/593 |
| 4,528,197 | 7/1985 | Blackburn . | |
| 4,637,937 | 1/1987 | Terada | 426/593 |
| 4,690,820 | 9/1987 | Simko . | |
| 4,753,963 | 6/1988 | Jandacek | 426/607 |
| 4,810,726 | 3/1989 | Bistrain et al. . | |
| 4,832,975 | 5/1989 | Yang . | |
| 4,847,296 | 7/1989 | Babayan et al. . | |
| 4,871,768 | 10/1989 | Bistrain et al. . | |
| 4,902,527 | 2/1990 | Galemkamp | 426/607 |
| 4,952,606 | 8/1990 | Babayan et al. . | |
| 4,960,602 | 10/1990 | Talkington | 426/607 |
| 5,081,105 | 1/1992 | Bistrain et al. . | |
| 5,215,780 | 6/1993 | Meidenbauer | 426/607 |

OTHER PUBLICATIONS

Encyclopedia of Food Technology, vol. 2 (ed by Johnson et al.,) pp. 511–513 Avi Publishing, Westport, Conn., 1974.
Bach et al., J. Parenteral Enteral. Nutr., 12(6) Suppl., pp. 82S–88S (1988).
DeMichele et al., Am. J. Clin. Nutr., 50, pp. 1295–1302 (1989).
Mok et al., *Metobolism*, 13(10), pp. 910–915, (1984).
Stein et al., Am. J. Physiol., 246 (Endocrinol. Metab. 9), pp. E277–E287 (1984).
Trochi et al., J. Parenteral Enteral. Nutr., 11(6), pp. 521–527 (1987).

*Primary Examiner*—Carolyn Paden
*Attorney, Agent, or Firm*—Klauber & Jackson

[57] ABSTRACT

Solid and liquid food products are disclosed containing partially hydrogenated structured lipids which are convenient and palatable and designed to provide a high caloric density. These products are a source of caloric energy for the military, athletes or other persons with high caloric needs.

7 Claims, No Drawings

HIGH ENERGY FOOD PRODUCTS CONTAINING PARTIALLY HYDROGENATED STRUCTURED LIPIDS

The invention herein was supported by National Institutes of Health Grant No. DK 35612. The government may have certain rights therein.

This application is a continuation of application Ser. No. 07/948,282, filed Sep. 18, 1992, now abandoned.

BACKGROUND OF THE INVENTION

The inventor is a co-author of the following paper: "Glycerol Kinetics With Parenteral Lipid Emulsions (LCT, MCT and SL) in Rats", D. Drews, M. D. Schluter and T. P. Stein, *Metabolism*, 42:743–748 (1993).

The present invention relates to food products containing partially hydrogenated structured lipids. More particularly, these food compositions possess valuable properties as a high energy food source for the military and for athletes who have a need for a palatable and convenient food source with a high caloric density.

In the past, numerous high energy food compositions have been proposed which have met with varying degrees of success. Most are saccharide-based and contain high levels of simple and complex carbohydrates. These tend to provide the consumer with what is perceived as an energy boost. However, the compositions, as a source of energy, have little advantage over a normal diet, or the contents of a normal diet given at a similar level of hydration.

The present invention utilizes materials known as "partially hydrogenated structured lipids", or PHSLs, as an extremely high source of calories as the energy source of the composition. "Partially hydrogenated structured lipids" are structured lipids which have been subjected to food-grade hydrogenation processes, resulting in a product having a lower degree of unsaturation than the starting structured lipid.

While structured lipids have been extensively utilized as a food source for patients which are severely compromised, e.g., burn patients, these compositions have limitations which make them unsuitable for the requirements of athletes and the military.

Babayan, et al., U.S. Pat. No. 4,952,606, issued on Aug. 28, 1990, relates to a dairy fat containing structured lipid composition. The composition is reported to show unexpected nutritional benefits.

Babayan, et al., U.S. Pat. No. 4,847,296, issued on Jul. 11, 1989 relates to a structured lipid composition which can be administered enterally for patients undergoing severe metabolic stress, such as surgical burn patients.

Bistrian, U.S. Pat. No. 5,081,105, issued on Jan. 14, 1992 relates to a method of treating cancer using structured lipids and other agents, such as tumor necrosis factor.

Bistrian, et al., U.S. Pat. No. 4,871,768, issued on Oct. 3, 1989 relates to structured lipids containing omega 3 fatty acids and medium chain fatty acids.

Bistrian, et al., U.S. Pat. No. 4,810,726, issued on Mar. 7, 1989 relates to a lipid emulsion containing medium and long chain triglycerides.

Blackburn, U.S. Pat. No. 4,528,197, issued on Jul. 9, 1985 relates to the used of structured lipids in hypercatabolic mammals. The composition involves a mixture of medium and long chain fatty acids, and is reported to provide more than 60% of the total caloric requirements of the mammal without immunological impairment.

Simko, U.S. Pat. No. 4,690,820, issued Sep. 1, 1987, relates to a high caloric, high fat dietary composition having an increased proportion of fat, which is utilizable for enteral hyperalimentation of critically ill patients.

None of the references noted above disclose a composition which is convenient and palatable, and which can be used as a major source of calories for short period of time by individuals who are healthy and essentially uncompromised. The present invention involves the administration of a food product containing partially hydrogenated structured lipids to a mammal to provide a source of energy. Typically, such mammals are those such as athletes and the military who require a food product providing a high level of usable calories, for purposes of training or during a particular athletic event, such as marathon running, or a food source which can be utilized during mobile activities, such as military maneuvers, where convenience and compactness is required.

The structured lipids utilized in the treatment of patients in abnormal metabolic stress states induced by trauma or sepsis are not suitable sources of nutrition for athletes or the military since they are in a normal or "uncompromised" state.

The structured lipids that have been designed for clinical use, especially those to be administered parenterally, are based on vegetable oils high in polyunsaturateds, particularly linoleic acid, where it is necessary to prevent essential fatty acid deficiency from developing. The mechanism of essential fatty acid depletion is that continuous feeding of high glucose regimens leads to essential fatty depletion in the non-adipose tissues. But the high plasma insulin levels inhibit lipid mobilization from the adipose tissues (where there is plenty of linoleic acid) and so the non-adipose tissues rapidly (within 7–14 days) become depleted of the essential fatty acids. With normal eating patterns, the plasma insulin levels drop at night and after the post-absorptive phase. Between meals and at night, plasma insulin levels drop. This allows normal lipid mobilization and replenishment of linoleate in the depleted tissues. Therefore, uncompromised patients with normal feeding patterns of meals and snacks, this problem does not arise.

It is necessary to maximize the available energy content to support metabolism—as opposed to the theoretical energy content of the lipid. The theoretical energy content is the maximal amount of energy that can be obtained from the lipid by bomb calorimetry. The available energy is the amount of energy available to support tissue energy requirements after the digestion, absorption and processing of the lipid have been accomplished. The use of lipids high in polyunsaturateds is thus contra-indicated.

First, the utilization of triglycerides rich in linoleic acid such as those derived from safflower, soybean, sunflower and other vegetable oils waste energy in their metabolism. Specifically, there is increased substrate cycling with these lipids (Drews et al., *Metabolism*, supra). Up to 20% of the energy content of the triglyceride can be wasted with such substrate cycling. The administered lipid after digestion and absorption is then taken up by the liver and adipose tissue, modified via hydrolysis and reesterification (TG-FFA cycling) and then either stored or oxidized. The more linoleic acid in the triglyceride, the greater the cycling. The cycling occurs because of the physiological need to regulate free linoleic-arachidonic acid levels due to their roles are precursors of prostaglandins. Thus, lipolysis of triglycerides rich in linoleic acid releases unacceptably high levels of linoleic acid on hydrolysis. To prevent this from becoming a problem, the linoleic content of the triglycerides is reduced by mixing them with endogenous triglycerides. The process is known as Triglyceride-Free Fatty Acid (TG-FFA) cycling. Thus, in a conventional triglyceride emulsion derived from soybean oil and labeled with $^{14}C$ given to dogs, 60% of the label is still in the dog 24 hours later (see *Metabolism* paper, supra). The source of the fat oxidized on giving a mixture high in such triglycerides is the equilibrated triglyceride. In order to provide the maximum amount of usefully usable calories, the lipid formulation should not include as a major component, fatty acids which stimulate this TG-FFA cycling.

Secondly, the administration or ingestion of a high concentration of linoleic and other polyunsaturated fatty acids has been shown to result in activation of the arachidonic acid—prostaglandin pathway which can lead to an exaggerated response to stress. Thus, in a food product for athletes or the military, as a high energy calorie source, this would be a serious disadvantage. An exacerbated response to injury is highly undesirable for troops under field conditions where they may well be injured.

Accordingly, it is an object of the present invention to provide a food product formed of partially hydrogenated structured lipids which provide a convenient and palatable food source while meeting the specialized nutritional high energy requirements of athletes and the military.

A still further object is to provide a composition which can be formulated with a minimum amount of water or other liquid contained therein.

Another object is to provide a composition which can be readily transported by the individual during a particular athletic event or other endeavor, with the individual during training, or transported on its own.

These and other objects and features of the invention will be apparent to those of ordinary skill from the following description.

SUMMARY OF THE INVENTION

The present invention concerns a food product comprised of a partially hydrogenated structured lipid in an amount of 40–80%. The food product also includes 20–60% non-fat components for providing non-lipid energy, e.g. carbohydrates, simple and complex, protein, and components for providing texture and palatability such as sweeteners, flavorants, emulsifiers and/or texturizers.

DETAILED DESCRIPTION OF THE INVENTION

The invention described herein utilizes partially hydrogenated structured lipids to formulate a food product which provides a high energy calorie source for individuals who need high levels of energy due to training or other physical exertion, and situations where the transport of highly concentrated forms of food and energy are desirable.

As used herein, the term "structured lipid" refers mixtures of fatty acids, covalently bound to fatty acids via ester linkages, and transesterified using any of numerous techniques, such as reaction under alkaline conditions, to form the structured lipid composition. Preferred structured lipids are mixtures of triacyl glycerides where at least one, but not more than two of the fatty acid moieties are straight medium chain length fatty acids (C-8 to C-12) and the remaining one or two glycerol hydroxyls esterified with a straight long chain fatty acid (C-16 to C-24, and most preferably C-16 and C-18).

A typical SL for use herein is that available from the Braun Company (as used in their preparation # E-89032) which has the composition:

| | |
|---|---|
| Caprylate (%) | 16.5 |
| Caprate (%) | 17.8 |
| Palmitate (5) | 10.4 |
| Stearate (%) | 5.0 |
| Oleate (%) | 17.1 |
| Linoleate (%) | 33.2 |
| Linolenate (%) | trace |

The Iodine value for this lipid is about 85 with about two-thirds of the unsaturation being from the linoleate moiety. By partial hydrogenation, the Iodine value is reduced by about 30%, to 60 or less to afford a useful partially hydrogenated structured lipid.

The aforementioned U.S. Pat. Nos. 4,847,296 and 4,952,606 describe in detail various preparative methods for structured lipids. These structured lipids are then subjected to food-grade hydrogenation processes to reduce the degree of unsaturation (as measured by the iodine value) by 20–40%, and preferably by about 30%, or more. Typically, the partially hydrogenated structured lipids will have iodine values in the range of 30–65.

Representative techniques for such hydrogenation are those described in Campbell and Thomas, "Hydrogenation" in the *Encyclopedia of Food Technology*, Vol. 2, (ed by Johnson et al), pp. 511–513 (Avi Publishing, Westport, Conn., 1974).

Optionally, the degree of hydrogenation can be complete or virtually complete, although some unsaturation affords preferable characteristics in the practice of this invention.

The food product described herein contains from about 40 to 80% of partially hydrogenated structured lipids, (PHSLs) depending upon the desired caloric content of the composition. Preferred food products contain between 70–80% of PHSLs on a w/w basis. Highly preferred food products contains about 75% PHSL on a w/w basis.

The food products of this invention may also contain optional ingredients which supplement the nutritional value thereof, such as vitamins, if desired. For example, if the composition is in a solid form, such as a candy bar, sweeteners may be included, such as sucrose, corn syrup or an artificial sweetener. In this embodiment, different binders and stiffening agents may be included to solidify the composition if necessary. These may include various polysaccharides, esterifying agents and the like.

The remaining non-fat ingredients of the food products of this invention may include some or all of the following: carbohydrates, proteins, and components for providing texture and palatability such as sweeteners, flavorants, emulsifiers and/or texturizers, in an amount of about 20% to about 60% by weight of the composition.

Typical carbohydrates are polysaccharides which may be low or high molecular weight polysaccharides, and include without limitation starch acid hydrolyzed starch, dextrins, from high to moderate molecular weight, particularly hydrolyzed dextrins, simple and complex sugars, such as glucose, lactose, fructose, raffinose, galactose, sucrose, invert sugar, honey, molasses, and other oligomers and polymers.

The oligo and polysaccharides may also include amylose, amylodextrin, polydextrins, oligodextrins of from 6 t 14 monomeric units in length, enzyme modified polydextrins, enzyme modified forms of the foregoing polysaccharides and acid and base hydrolyzed forms of the foregoing oligo and polysaccharides.

The food products may also include saturated and unsaturated fatty acids and derivatives thereof other than the PHSLs described herein. These ingredients may be included in minor amounts and may include compounds which are plant, as well as, animal-derived. Preferably, oils which contain cholesterol or which may be metabolized to cholesterol are avoided. Soybean oil, corn oil, saffron oil, sunflower seed oil, palmitic oil, linoleic oil and like products having a chain length of C-10 to about C-30 can be used.

When optional ingredients are to be included, the composition may also include one or more flavorants. These can be selected from a wide range of conventional agents, such as fruit flavors, chocolate, butterscotch, peanut butter and the like.

Another optional ingredient which may be included herein is a preservative, such as BHA, BHT, potassium sorbate and the like. Additionally, the food product of the present invention can be formulated in reduced weight form, e.g., essentially a dehydrated form, for purposes of transporting the composition over distances. This again, is applicable to runners, bicyclists, other athletes, and the military who transport their calorie source during the particular athletic event, and also those individuals who are transported over distances with the food source, or stationed in remote locations, and must contend with an intermittent supply of food.

It is contemplated that the solid food products of this invention will contain about 5.5 calories/gram to about 7.5 calories/gram. A typical solid candy bar-type formulation will thus contain about 500 calories in a standard 70 gram size bar. About 85% of the energy content of the food product will usually be contributed by the PHSLs contained in the food product. The solid food products of the invention thus possess a high caloric density resulting in a nutritional source which is compact and readily available.

In an alternate embodiment, the partially hydrogenated structured lipids of the present invention can be utilized as a substitute for structured lipids or other fats in liquid food products normally having a fat component. For instance, a high-caloric density milkshake-type food product can be formulated using 50–80% partially hydrogenated structure lipid and 20–50% non-fat components, in admixture with water. Typically, the water content of the liquid food product is adjusted so as to comprise about 60–80% of the final emulsion/solution. This results in an emulsion/solution having a partially hydrogenated structured lipid of about 10–20% by weight and about 4–10%, by weight of non-fat components.

Representative of the liquid formulation products where the partially hydrogenated structured lipids of the present invention would be useful include parenteral lipid emulsions, enteral food supplements, high calorie athlete drinks of the Gatorade® type, and infant feeding formulas.

The invention is further described in connection with the following non-limiting examples.

EXAMPLE 1

Preparation of Partially Hydrogenated Structured Lipid (PHSL)

A typical structured lipid available from the Braun company (as used in their preparation # E-89032) has the composition:

| | |
|---|---|
| Caprylate (%) | 16.5 |
| Caprate (%) | 17.8 |
| Palmitate (%) | 10.4 |
| Stearate (%) | 5.0 |
| Oleate (%) | 17.1 |
| Linoleate (%) | 33.2 |
| Linolenate (%) | trace | and an iodine value of about 85, with about two thirds of the unsaturation being from the linoleate moiety. Using the partial catalytic hydrogenation described by Campbell, supra, the Iodine number is reduced by about 30%, to 60 or less, as determined by the method of L. F. Fieser and M. Fieser, *Textbook of Organic Chemistry*, pp. 59–63 and 407–410 (Reinhold Publishing Co., N.Y., 1956).

EXAMPLE 2

Chocolate Covered Candy Bar Formulation

A candy bar comprised of 50–80% PHSL is formulated.

The ingredients, partially hydrogenated structured lipid as prepared in Example 1, (50 to 85% by weight), sweeteners (corn syrup, sugar, invert, dextrose and other carbohydrate sweeteners (10 to 30%), emulsifier (lecithin, mono and diglycerides, Spans and Tweens), flavorings (e.g., cocoa butter) and texturizers, if needed (starches and gums), are mixed together and cooked to the 6 to 14% moisture level. The cooking is done at atmospheric pressure in the temperature range 110° C. to 160° C., or under reduced pressure to bring the water content down, using automated machines such as the Cherry-Burrel and Votator units or similar machines. Alternately, a continuous feed type of machine (e.g. that made by Baker-Perkins or Groen), is used, which cooks the mixture to about 160° C. and to moisture contents as low as 15% if desired Homogenization and water removal may also be accomplished using a continuous vacuum cooker. The cutoff, extruded pieces are then deposited onto a traveling belt going to chocolate bottomers and enrobers to provide a chocolate covering for the candy bar.

EXAMPLE 3

Cookie-Type Candy Bar

The partially hydrogenated structured lipid of Example 1 is mixed with emulsifier and flavorings and cooked to the 6 to 14% moisture level as in Example 2. A biscuit or cookie type of material comprised of flour, sugar and shortening, is then inset around the extruded and cut-off paste. This combination is then optionally enrobed with a chocolate coating to afford a chocolate-covered cookie-type candy bar.

EXAMPLE 4

Gatorade® type Drink for Athletes

Partially hydrogenated structured lipid, as produced in Example 1, is mixed with water, and homogenized to uniform particle size with a "Polytron" (Brinkman Inc., New York) to make a 20% emulsion. Mixing with an equal volume of about 10% glucose, plus stabilizers (e.g. lecithin, glycerol), flavorings, colorings and antioxidants (e.g., BHT) and agents to modulate the viscosity of the mix (e.g., gums, detergents) affords a drink suitable for athletic ingestion having a total energy density in this particular formulation of 1.25 kcal/g. Using 20 ml of 40% glucose would yield an energy density of about 1.7 kcal/g.

EXAMPLE 5

Enteral Food Product

Partially hydrogenated structured lipids, as produced in Example 1, are mixed with 20% milk or soy protein, corn syrup and trace amounts of vitamins and minerals to afford a food product for enteral feeding.

While it is recognized that certain preferred embodiments are described herein in detail, numerous alternative embodiments are contemplated as falling within the scope of the claims appended hereto. Consequently the scope of the claims is not to be limited to the specific embodiments herein.

What is claimed is:

1. A method of preparing a solid high caloric density food product which avoids the stimulation of the Triglyceride-Free Fatty Acid (TG-FFA) cycling and activation of the arachidonic acid—prostaglandin pathway which comprises mixing from about 40 to about 80% by weight of a partially hydrogenated structured lipid said partially hydrogenated structured lipid being a mixture of triacylglycerides wherein at least one, but not more than two of the fatty acid moieties are straight medium chain length fatty acids (C-8 to C-12) and the remaining one or two glycerol hydroxyls are esterified with a straight long chain fatty acid (C-16 to C-24), and having an iodine value in the range of 30–65, said structured lipid avoiding the stimulation of the Triglyceride-Free Fatty Acid (TG-FFA) cycling and activation of the arachidonic acid—prostaglandin pathway; with about 20–60% non-fat ingredients.

2. A food product according to claim 1 which comprises 70–80% partially hydrogenated structured lipid; and 20–30% non-fat ingredients.

3. A food product according to claim 1 which provides a caloric density of about 5.5 to 7.5 calories/gram.

4. A food product according to claim 1 which is shaped as a candy bar.

5. A method of preparing a liquid high caloric density food product which avoids the stimulation of the Triglyceride-Free Fatty Acid (TG-FFA) cycling and activation of the arachidonic acid—prostaglandin pathway which comprises mixing from about 10 to about 20% by weight of a partially hydrogenated structured lipid said partially hydrogenated structured lipid being a mixture of triacylglycerides wherein at least one, but not more than two of the fatty acid moieties are straight medium chain length fatty acids (C-8 to C-12) and the remaining one or two glycerol hydroxyls are esterified with a straight long chain fatty acid (C-16 to C-24), and having an iodine value in the range of 30–65, said structured lipid avoiding the stimulation of the Triglyceride-Free Fatty Acid (TG-FFA) cycling and activation of the arachidonic acid—prostaglandin pathway; with about 4–10% non-fat ingredients and 70–86% water.

6. A liquid food product according to claim 5 adapted for enteral feeding.

7. A liquid food product according to claim 5 for oral ingestion.

* * * * *